UNITED STATES PATENT OFFICE.

JOHN COMMINS, OF CHARLESTON, SOUTH CAROLINA.

IMPROVEMENT IN DISINFECTANT, DEODORIZER, AND FUMIGATOR.

Specification forming part of Letters Patent No. 184,700, dated November 28, 1876; application filed October 18, 1876.

*To all whom it may concern:*

Be it known that I, JOHN COMMINS, of Charleston, county of Charleston, and State of South Carolina, have invented certain new and useful Improvements in Combined Disinfectant, Deodorizer, and Fumigator, of which the following is a full, clear, and exact description:

The object of my invention is to produce a cheap and effective article which shall possess at once all the requisite qualities of a disinfectant, a deodorizer, and a fumigator; and it (the invention) consists in certain processes of treating charcoal or equivalent material, and in the improved article produced, as will be hereinafter more fully described, and then pointed out in the claims.

I employ charcoal as a vehicle or carrier for the chemicals used on account of its inflammability and its inherent deodorizing qualities, and because of the facility with which I can saturate it with said chemicals.

To prepare the article, I take about six parts of sulphur, one part of carbolic acid, and one part of iodine, heat them together, and thoroughly mingle them in a suitable vessel. Charcoal is then immersed in the heated solution, absorbing more or less of the chemical mixture, according to its texture or capillary power. This absorption may, if desired, be considerably increased by placing the materials in a closed vessel, and exhausting the air therefrom in the manner of impregnating wood with preservative matters, although this operation will seldom be found necessary or of advantage.

The sulphur and the iodine add considerably to the inflammability of the mass, and render it more easy to be consumed when it is desirable to employ it as a fumigator. The union of the iodine and carbolic acid with the sulphur prevents the too rapid condensation of the fumes of the latter, and thus removes the only defect in its properties as a fumigator. The several ingredients, when aggregated, constitute an article which completely answers the specified objects of the invention.

When employed as a disinfectant or a deodorizer it will only be necessary to expose the mass to the air, its qualities being such as to admit of the complete evaporation of the deodorizing and disinfecting chemicals. As a fumigator, a quantity of the mass may be easily kindled and burned upon a shovel, or in any suitable manner.

To further improve the article, I propose to roll it in, or dust it with, powdered lime after it has been saturated, as explained. This gives an exterior coating to the mass, which will add the following desirable qualities to the article: It renders it cleanly to the touch, and convenient to be burned in the hand after the manner of a candle or taper; it forms an exterior coating, which will serve, in a measure, to retard the too rapid evaporation of contained chemicals, and prevent adherence of the several pieces of saturated coal; it adds to the beneficial qualities of the mass without detracting from either of them.

For convenience in using and shipping I propose to pack the article in convenient quantities in paper or material which will prevent deterioration. Each package may contain a quantity to serve the uses of a small house.

As thus prepared and packed the article will be found useful on board ships, in infected districts, and, in fact, wherever any one or more of its qualities may be desirable. The several ingredients named are deemed the best for the purposes specified; but coke, caked sawdust, or the like, might be employed as a carrier, and other disinfectants and deodorizers than iodine and carbolic acid might be mingled with the melted sulphur.

Having now fully described my invention, what I claim as new, and desire to secure by Letters Patent, is—

1. The herein-described combined disinfectant, deodorizer, and fumigator, composed of charcoal, sulphur, iodine, and carbolic acid, in about the proportions specified.

2. The outer coating of lime, combined with the herein-described disinfectant, deodorizer, and fumigator, as and for the purposes specified.

In testimony that I claim the foregoing I have hereunto set my hand in the presence of two witnesses.

JOHN COMMINS.

Witnesses:
J. LUCAS, Jr.,
H. D. BICAISE.